United States Patent [19]

Banta

[11] Patent Number: 5,070,576
[45] Date of Patent: Dec. 10, 1991

[54] HEDGE TRIMMER EXTENSION HANDLE APPARATUS

[76] Inventor: Jerry W. Banta, 638 Mount St., Diamond Bar, Calif. 91765

[21] Appl. No.: 616,990

[22] Filed: Nov. 21, 1990

[51] Int. Cl.$^5$ .......................... B25G 1/00; B25G 3/00; A01D 1/14; A01G 3/06
[52] U.S. Cl. ............................... 16/114 R; 16/116 R; 16/126; 30/231; 30/296.1; 30/340; 56/DIG. 18
[58] Field of Search ............. 16/114 R, 111 R, 116 R, 16/119, 126; 74/544; 56/233, 234, 236, DIG. 18; 30/122, 231, 232, 235, 296.1, 312, 340, 500; 81/177.2

[56] References Cited

U.S. PATENT DOCUMENTS

| 1,779,031 | 10/1930 | Casey | 30/500 |
|---|---|---|---|
| 1,897,543 | 2/1933 | Albrecht . | |
| 2,153,771 | 4/1939 | Orr . | |
| 2,718,231 | 9/1955 | DeLano | 30/231 |
| 2,762,186 | 9/1956 | Janata . | |
| 3,218,789 | 11/1965 | Ott et al. | 56/233 |
| 4,197,764 | 4/1980 | Auernhammer | 30/340 |
| 4,207,675 | 6/1980 | Causey et al. | 30/296.1 |
| 4,317,282 | 3/1982 | Pace | 30/500 |
| 4,515,423 | 5/1985 | Moore et al. | 30/122 |
| 4,638,562 | 1/1987 | Drake | 30/340 |
| 4,733,470 | 3/1988 | Firman | 30/296.1 |
| 4,976,031 | 12/1990 | Miller | 30/296.1 |

FOREIGN PATENT DOCUMENTS 2492047  4/1982  France ................................. 56/233

Primary Examiner—Robert L. Spruill
Attorney, Agent, or Firm—Knobbe, Martens, Olson & Bear

[57] ABSTRACT

A hedge trimmer extension handle for use with hand held hedge trimmers provides extended reach for the operator when used in connection with the hedge trimmer. The extension handle device is adapted for use with Black & Decker electric hedge trimmers and provides an easy to use extension handle that the user can quickly attach to the hedge trimmer to reach vegetation which is beyond the user's reach either vertically, horizontally, or both.

5 Claims, 2 Drawing Sheets

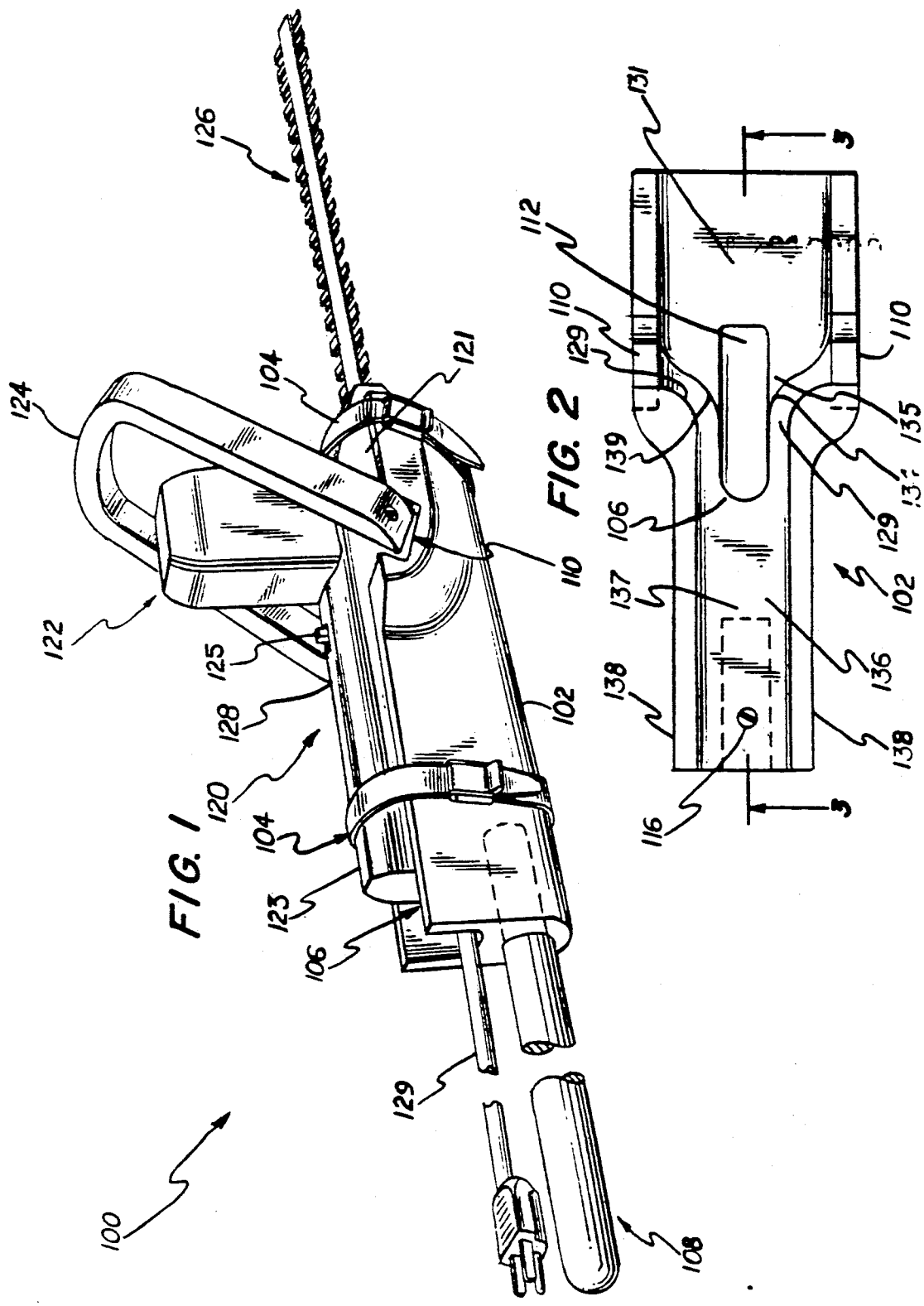

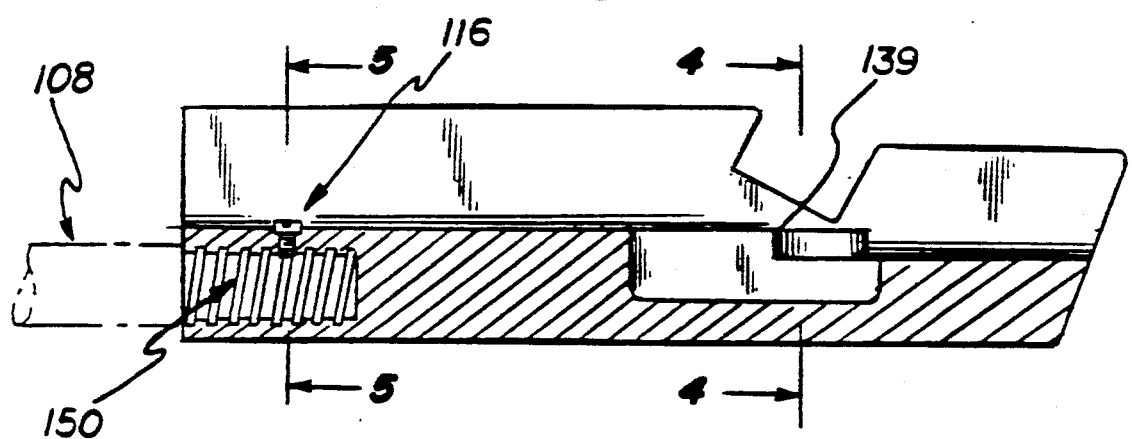
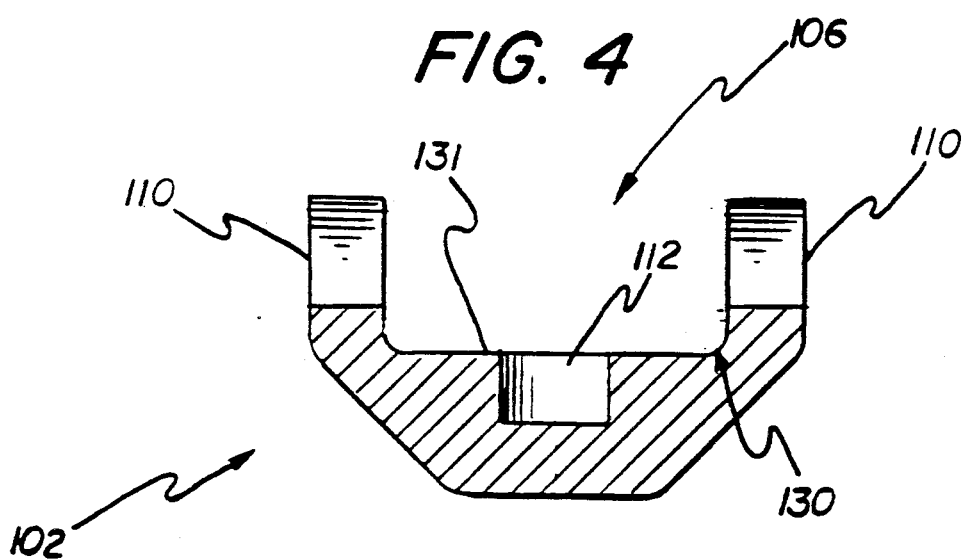
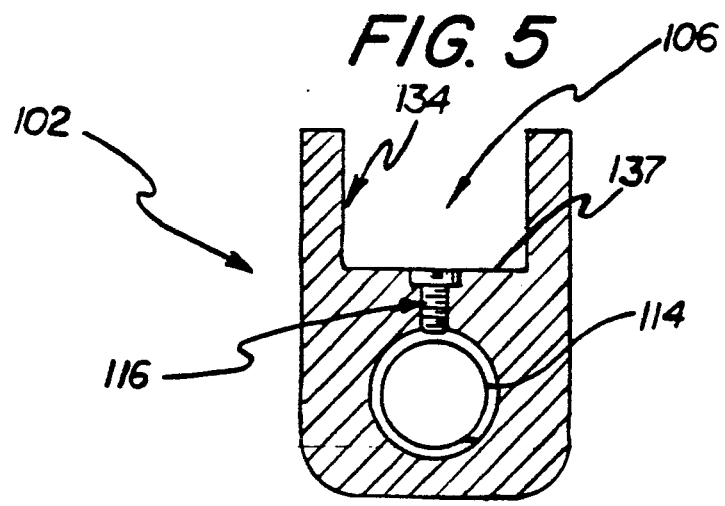

HEDGE TRIMMER EXTENSION HANDLE APPARATUS

BACKGROUND OF THE INVENTION

1. Field of the Invention

This invention relates to devices for yard maintenance, decorative tree and hedge trimming, and tree pruning.

2. Description of Related Art

When pruning tall hedges or decorative trees, the user of an electric hedge trimmer constantly faces the problem that bushes, branches, or other vegetation that needs trimming are beyond the reach of the hedge trimmer when the operator stands on the ground and holds the hedge trimmer as normally intended. Therefore, most users resort to utilizing a ladder. If the vegetation is too high, the operator will position the ladder, climb the ladder, trim the area within an arm's reach, climb down, move the ladder and then repeat the process. This becomes tiresome and frustrating. Often, in an attempt to minimize this cumbersome process, the operator will reach beyond a safe distance in order to maximize the area trimmed with each move of the ladder. Unfortunately, this poses a substantial risk of falling from the ladder when an operator extends his or her reach beyond the bounds of safe balance. If the hedge is too wide, then a similar problem develops. The operator cannot reach across the hedge, so the operator climbs a ladder or some other apparatus and precariously leans over the hedge while balancing on the ladder. This process is time-consuming, tiresome, and again compromises the operator's safety.

Tree pruning is also a slow process usually involving an extension saw or sheer which cuts one limb at a time. Hedge trimmers would be much faster for small limbs, but the operator is again limited to an arm's reach or proceeding with the previously described ladder process.

Notwithstanding these inconveniences, few improvements have been introduced to solve these problems.

Ott, et. al (U.S. Pat. No. 3,218,789) describes a rotary lawn and hedge trimmer device which configures a household electric drill as a lawn edger or hedge trimmer. This device holds the drill and includes a handle so the operator can stand erect and trim the lawn. However, when the device is used as a hedge trimmer, the handle is generally removed in order to make handling the device more convenient (Column 4, Lines 14–16). Furthermore, were the handle not removed, it appears that the torque and shear forces exerted on the hedge trimmer as the rotary blade cuts the vegetation would be sufficient to render the use of the handle unsafe.

Orr (U.S. Pat. No. 2,153,771) discloses a grass cutter and hedge trimmer which has an attached handle. This device is a rotary trimmer which provides a function similar to modern fish-line trimmers. This device does not provide a way to extend the reach of an operator using a sickle type electric hedge clipper.

Janata (U.S. Pat. No. 2,762,186) describes a self-contained hedge cutting machine. The machine uses an electric sickle knife connected to an independent power source mounted on the machine. However, this device is cumbersome for household use because the machine is bulky and must be set up for use. An operator might just as well proceed with the ladder process described. Moreover, this machine does not provide a simple way to extend an operators reach for pruning trees or for free-hand trimming of hedges and decorative vegetation because the machine is intended to cut at a predetermined angle. Finally, this device does not make accommodations for a hedge that is too wide.

Albrecht (U.S. Pat. No. 1,897,543) also describes a hedge cutter. This device provides a hedge cutter powered by the operator who pushes the device along the ground. This device does hold a sickle knife for trimming hedges; however, it does not allow free-hand trimming of non-uniform hedges, decorative plants or trees. It also does not accommodate hedges that are too wide for the sickle knife swath.

None of these devices provides an economical, quick and easy to use system for extending an operator's reach when using a hand-held electric hedge trimmer.

Accordingly, a device which extends the users reach when used in connection with an electric hand held hedge trimmer would greatly simplify and increase the safety and versatility of this device when vegetation is beyond the operator's reach. Such a device, to be useful, should be easy to attach and remove from the hedge trimmer without the use of tools or cumbersome mechanisms. The device should also be economical, lightweight, durable, and strong enough to prevent breakage when the user applies sufficient pressure to use the trimmer as intended to trim vegetation.

SUMMARY OF THE INVENTION

The present invention provides a new and simple to use hedge trimming system which can be used quickly without the need of any other tools or apparatus to extend an operator's reach while permitting the free maneuverability of the hedge trimmer.

One aspect of the invention is a hedge trimming system including a standard hedge trimmer, such as those produced by Black & Decker, and an extension device. The hedge trimmer includes an elongate body, a generally U-shaped handle and an elongate sickle knife assembly The elongate body includes a wider and deeper front body portion, a narrower and shallower rear body portion and a central body portion connecting the front body portion to the rear body portion. As used herein, "deeper" is used to describe a portion which depends downward further than another portion which is considered to be "shallower." The central body portion includes a raised motor containing portion. The generally U-shaped handle is formed by a pair of elongate arms and a connecting gripping section, wherein the ends of the pair of arms distal the gripping section are secured to the body on either side of the motor containing portion. The elongate sickle knife assembly extends longitudinally outward from the front body portion and includes an elongate central bar having blades extending horizontally outward from its elongate sides and an elongate longitudinally reciprocating cutter having blades extending horizontally outward from its elongate sides. The blades of the bar and the blades of the cutter cooperate to slice vegetation between them as the cutter reciprocates. A finger grip depends from the central body portion of the trimmer body to permit the trimmer to be firmly grasped by the operator when the trimmer is held in the hand.

The extension device enables an operator to safely hold the body of the hedge trimmer away from the body of the operator so that the user can reach vegetation which would have been out of reach if the operator stood on the ground and held the hedge trimmer directly. The extension device includes an elongate securing member and an elongate shaft. The elongate securing member has a front end and a rear end and defines a longitudinal channel. A forward cradle portion defines a forward portion of the channel. This forward channel portion is generally U-shaped, having a generally flat horizontal bottom between a pair of vertical sides. The bottom has a width slightly greater than the width of the front body portion of the trimmer and the sides have a height sufficient to prevent the side to side movement of the front body portion of the trimmer when it is secured within the securing member.

A first securing strap extends from one side of the forward cradle portion to the other side of the forward cradle portion. A first fastener secures the first securing strap between the sides of the forward cradle portion tightly over and against the front body portion of the trimmer.

A rearward cradle portion defines a rearward portion of the channel. This rearward channel portion is generally U-shaped, having a generally flat horizontal bottom between a pair of vertical sides. The bottom has a width slightly greater than the width of the rear body portion of the trimmer and sides which have a height approximately one-half the height of the rear body portion of the trimmer. A second securing strap extends from one side of the rearward cradle portion to the other side of the rearward cradle portion. A second fastener secures the second securing strap between the sides of the rearward cradle portion tightly over and against the rear body portion of the trimmer.

A center cradle portion connects the forward cradle portion and the rearward cradle portion. This center cradle portion defines a center portion of the channel connecting the forward portion of the channel to the rearward portion of the channel. The center portion of the channel is generally U-shaped, having a bottom and a pair of vertical sides. The bottom of the center cradle portion defines a generally arcuate vertical shoulder between the forward portion of the channel and the rearward portion of the channel. The bottom of the center cradle portion is also of decreasing width from front to rear so that the sides of the center portion of the channel form a pair of horizontal shoulders between the forward portion of the channel and the rearward portion of the channel. The bottom of the center cradle portion further defines a longitudinally elongate vertical recess having a depth which is slightly greater than the height of the finger grip and a width slightly greater than the width of the finger grip.

The trimmer end of an elongate shaft is secured to the rear end of the securing member, wherein during operation the operator end of the shaft is supported and the angle and position of the operator end of the shaft is controlled by the hands of the operator allowing the operator to freely maneuver the trimmer end of the shaft.

Desirably the sides of the center cradle portion extend vertically above the ends of the pair of arms of the trimmer handle, distal the gripping section and each of the sides further defines a notch which restricts the forward and rearward movement of the distal ends of the handle relative the trimmer handle.

Desirably the sides of the forward body portion of the extension are at least one-quarter of one inch tall, thereby ensuring that the front body portion of the trimmer is prevented from moving side to side. Additionally, it is desirable that the first and the second securing strap surround both the trimmer and the securing member.

Another aspect of the invention is a novel extension device forming a portion of the hedge trimming system described above.

The hedge trimming system of the present invention provides an economical, quick and easy to use system for extending the operator's reach when using a hand-held electric hedge trimmer. Importantly, due to the danger to the operator of being cut by the reciprocating blade should the hedge trimmer ever become separated from the extension device, the unique structural configuration of the extension device insures that the hedge trimmer is safely and firmly secured within the securing member during operation and is able to withstand the torque and shear forces acting on the extension device, even when the hedge trimmer handle is 12-14 feet along.

Advantageously, the securing member defines a longitudinal channel which is desirably configured so as to prevent any movement of the hedge trimmer relative the channel. Specifically, the raised sides of the forward channel portion and the rearward channel portion prevent the rotation of the trimmer about a vertical axis (i.e., an axis perpendicular to the elongate knife assembly of the trimmer). Additionally, due to the snug fit of the body portion of the trimmer within the channel, the opposing sides of the channel resist the rotation of the hedge trimmer about a longitudinal axis (i.e., about an axis parallel to the length of the elongate single knife assembly of the trimmer).

Any tendency of the trimmer to "pop out" of the channel is further resisted by the first and second securing straps and fasteners which bind the trimmer firmly in place. Preferably, one strap is positioned forward of the raised motor-containing portion of the trimmer and one strap is positioned rearward of the raised motor-containing portion of the trimmer so that, even if the straps are somewhat loosened and the hedge trimmer somehow pops out from its secure seat within the channel, the straps will prevent the raised motor-containing portion of the trimmer from moving in front of the first strap or rearward from the second strap so that the operator is protected from the full separation of the hedge trimmer from the extension device.

Desirably, the configuration of the channel of the securing member is such that it provides a firm seat and prevents any rearward motion of the hedge trimmer relative the securing member. Specifically, the bottom of the center cradle portion of the securing member desirably includes a vertical shoulder between the front portion of the channel and the rearward portion of the channel, thereby preventing the front body portion, which is deeper than the shallower rear body portion of the trimmer, from moving toward the operator. Likewise, since the bottom of the center cradle portion is also of decreasing width from front to rear, the sides of the center portion of the channel form a horizontal shoulder between the forward portion of the channel and the rearward portion of the channel. As will be appreciated, the horizontal shoulders prevent the rearward motion of the front body portion of the trimmer relative the securing member.

Desirably, the hedge trimmer also includes a finger grip depending from the central portion of the trimmer and the bottom of the central cradle portion of the securing member defines a longitudinally elongate vertical recess having a depth which is slightly greater than the height of the finger grip and a width slightly greater than the width of the finger grip. As will be appreciated, the finger grip and the recess cooperate to prevent the longitudinal movement of the tremor relative the securing number, side to side movement of the tremor relative the securing member and rotation of the securing member within the channel about a longitudinal access.

Desirably, the sides of the center cradle portion extend vertically above the ends of the pair of arms of the trimmer handle distal the gripping section and each of the sides defines a notch which cooperates with one of the distal ends of the trimmer handle to restrict the forward and rearward movement of the trimmer relative the shearing member. Additionally, the notch and the handle of the trimmer further cooperate to prevent the rotation of the trimmer about a longitudinal axis.

Due to the unique structural configuration of the securing member, even if extreme tensile force causes a strap to break, a single tightened strap is sufficient to keep the body of the trimmer securely within the channel so that the horizontal and vertical shoulders, as well as the side notches, prevent the disengagement of the hedge trimmer from the securing member and the potentially disastrous consequences. Finally, the U-shaped channel further acts to direct the electric cable (if any) of the electric hedge trimmer away from the single knife assembly of the trimmer to prevent the inadvertent cutting of the electric cord by the operator.

BRIEF DESCRIPTION OF THE DRAWINGS

FIG. 1 is a perspective view of the preferred embodiment of a hedge trimmer extension handle device of the present invention shown with a hedge trimmer situated and secured for use.

FIG. 2 presents a top view of the carrying member of FIG. 1.

FIG. 3 is a cross-sectional view of the carrying member taken along 3—3 in FIG. 2.

FIG. 4 is a cross-sectional view of the carrying member taken along 4—4 in FIG. 3.

FIG. 5 is a cross-sectional view of the carrying member taken along 5—5 of FIG. 3.

DETAILED DESCRIPTION OF THE PREFERRED EMBODIMENT

For simplicity, only some basic embodiments will be described. FIG. 1 depicts a hedge trimmer extension handle device 100 constructed in accordance with the present invention. The device 100 includes a carrying member 102, a plurality of securing devices 104, and an elongated handle 108. FIG. 1 also shows a Black & Decker electric hedge trimmer 120 positioned within the carrying member 102 and fastened in the carrying member 102 with the securing devices 104.

The hedge trimmer shown for use with the present invention is a Black & Decker electric hedge trimmer with a body 128, including a front body portion 121, a motor portion 122, a rear body portion 123, a handle 124 and controls 125. The hedge trimmer 120 also includes a sickle knife 126 and an electric power cord 129.

The carrying member 102 consists of a partial casing which has a substantially U-shaped channel 106 running lengthwise along the member 102. The carrying member 102 also defines notches 110 which receive the handle of the hedge trimmer and a recessed groove 112 to accommodate a protruding trigger-shaped grip (obscured from view) on the under side of the body 128 of the hedge trimmer 120. In one embodiment, the carrying member 102 also includes an aperture 114 (FIG. 5) for receiving the elongated handle 108 and a set screw 116 to fix the elongated handle 108 in place.

As seen in FIG. 2, the channel 106 in the carrying member 102 has a forward cradle portion 130, a rearward cradle portion 136, and an arcuate center cradle portion 134 connecting the forward and rearward cradle portions 130 and 136 respectively. The forward cradle portion 130 is generally wider than the rearward cradle portion 136. The arcuate center cradle portion 134, conforming to the body 128 of the hedge trimmer 120, forms an arcuate path which defines a pair of horizontal shoulders 129 and connects the forward cradle portion 130 with the rearward cradle portion 136.

Desirably, the forward cradle portion 130 of the 106 is generally U-shaped with a generally flat horizontal floor section 131 and two upright vertical side sections 132. To best receive and secure the front body portion 121 of a Black & Decker hedge trimmer body 128, the floor section 131 of the forward cradle portion 130 should measure approximately three (3) inches long and three and one half (3.5) inches between the vertical side sections. The its two upright vertical side sections 132 should measure approximately three (3) inches long. Desirably, the center arcuate cradle portion 134 of the carrying member 102 has an arcuate contoured bottom 135, as best seen in FIG. 2 which defines a vertical shoulder 139. The notches 110 of the carrying member 102 are defined along the edges of the center cradle portion 134. To best receive the motor portion 122 of a Black & Decker hedge trimmer body 128, the arcuate contoured bottom 135 should measure approximately one and one-half (1.5) inches in length. Desirably, the rearward cradle portion 136 is also generally U-shaped with a generally flat bottom section 137 and two upright vertical side sections 138. To receive and secure the rear body portion 123 of the Black & Decker hedge trimmer body 128 the bottom section 137 should measure approximately seven and three-quarters (7.75) inches long and one and one half (1.5) inches between the upright vertical side sections 138. The carrying member 102 of the present embodiment can universally attach to all three models (13", 16" and 18") of Black & Decker's electric hedge trimmers.

The groove or recess 112 begins in the center of the arcuate bottom 135 of the arcuate center cradle portion 134 and extends into the flat bottom section 137 of the rearward cradle portion 136. To best receive the trigger-shaped grip on the underside of the body 128 of the hedge trimmer 120, the recessed groove should measure approximately ⅞ inch wide, 3 inches long and start at the front of the center arcuate cradle portion 134.

The channel 106 forward, center arcuate, and rearward cradle portions 130, 134, 136 and which conform to the lower body portion (obscured from view) of the hedge trimmer 120 combined with notches 110 which receive the hedge trimmer 120 and the recessed groove 112 which the trigger-shaped grip, help the carrying member 102 to snugly cradle the hedge trimmer 120 and restrict movement of the hedge trimmer within the carrying member 102 as described below.

The arcuate center cradle portion 134 curves around the wider motor portion 122 of the hedge trimmer 128. This prevents the hedge trimmer 120 from slipping longitudinally along the channel 106 toward elongated handle 108. If the hedge trimmer 120 were to slip towards the rear portion of the carrying member 102, then the sickle knife 126 protruding from the hedge trimmer body 128 would fall within the carrying member 102 channel 106. This would reduce the swath width of the sickle knife 126.

The notches 110 combined with the recessed groove 112 and the snug conforming cradle formed by the channel's 106 forward cradle portion 130, center arcuate cradle portion 134, and rearward cradle portion 136 all help to prevent any axial rotation or slippage of the hedge trimmer 120 within the carrying member 102 when the hedge trimmer is fastened with the securing devices 104.

The carrying member 102 is long enough to cradle the entire length of the body 128 of the hedge trimmer 120 but does not ordinarily extend beyond the front body 121 of the hedge trimmer body 128 where the sickle knife 126 protrudes from the front body 128. The carrying member may extend beyond the rear body 123 of the hedge trimmer body 128 Where the cord 129 connects to the body portion 128 to direct the power cord 129 of the hedge trimmer 120 along the elongated handle 108 and away from the sickle knife 126 so as to minimize the risk of cutting the cord.

In one embodiment, the elongated handle 108 can also include a cord holder (not shown) to fasten the cord 129 along the elongated handle 108 or may even include a power outlet (not shown) to further prevent the risk of shock by reducing the possibility that the cord 129 will be cut accidentally by the sickle knife 126.

The securing devices 104 shown in the present embodiment consist of velcro straps and cooperating metal loops which securely hold the hedge trimmer in place. Because the velcro has no pre-set fastening positions like a belt, it can provide the exact length necessary to snugly fasten the hedge trigger 120 within the carrying member 102.

The carrying member may also include the aperture 114 as described. FIG. 5 depicts an end view of the aperture 114 necessary for receiving an elongated handle 18 into the carrying member 102. The aperture 114 can be threaded as seen in FIG. 3 to accept a threaded end 150 of the elongated handle 108 as shown in FIG. 3. Whether the aperture 114 is threaded or not, a set screw 116 can be used to tighten upon the handle 108 to fix the handle 108 to prevent its rotating, loosening, or pulling out of the carrying member 102.

The elongated handle 108, depicted in this embodiment, fits into and extends longitudinally from the carrying member 102. In this embodiment the handle 108 is detachably fixed or threaded within the carrying member 102 by use of the set screw 116 which prevents accidental removal. This makes it possible, if desired, to remove the handle 108 while attaching the carrying member 102 to the hedge trimmer 120. This also facilitates replacing the handle 108 if it were to break without having to replace the entire device 100. The elongated handle 108 in the present embodiment can safely extend the useful reach of the Black & Decker electric hedge trimmers to 14-16 feet from the operator.

It will be apparent to those skilled in the art that the elongated handle 108 could be formed as an integral part of the carrying member 102 or include a gripping surface with sculpted sections.

Once the hedge trimmer 120 is fastened within the carrying member 102, the extension handle is ready for use. The extension handle can provide extended reach to enable the user to quickly reshape and trim hedges, decorative shrubbery and trees while standing securely on the ground.

This device will significantly reduce the risks involved with using hand held hedge trimmers in numerous ways and greatly facilitate the convenience of using a hand held hedge trimmer. As explained previously, the process of climbing a ladder to reach out-of-reach vegetation poses substantial risks to the operator and becomes tiresome and time-consuming. The invention minimizes the risks associated with the ladder process because the extension handle allows the operator to safely operate the hedge trimmer as distances of 14-16 feet away from the operator. This greatly reduces the need for a ladder.

Moreover, the extension handle is safe for use even at 14-16 foot extensions because the carrying member securely cradles the hedge trimmer. The specific configuration of the carrying member with its forward, arcuate center, and rearward cradle portions 130, 134, and 136 respectively, and its securing devices minimizes the possibility of slippage or any rotation of the hedge trimmer. This is significant because trimming vegetation with the trimmer can involve significant forces in many directions. The configuration of this extension handle 100 holds the hedge trimmer 120 securely and overcomes these forces.

These features also make the extension handle 100 safe for use at close range. If a handle did not securely hold the hedge trimmer when used at close range, the trimmer 120 may slip or rotate within the extension handle 100 and injure the operator or cut the power cord 129. This configuration minimizes the risk of this occurring because it securely cradles the hedge trimmer 120 and utilizes the many features explained to resist the substantial forces involved in trimming vegetation to prevent slippage and rotation of the hedge trimmer.

The carrying member 102 and the elongated handle 108 may be made of wood, plastic, or some other composite material. Metallic materials will also work, but an electricity non-conducting material is preferred to minimize the risk of shock.

The descriptions of preceding embodiments are only exemplary of simple usage of the invention to provide an extension handle for use with a hedge trimmer. Many other embodiments and variations are intended which include other features of the invention.

I claim:
1. A hedge trimming system, comprising:
   a hedge trimmer, comprising:
   an elongate body including a wider and deeper front body portion, a narrower and shallower rear body portion and a central portion connecting said front body portion and said rear body portion, with said central portion including a raised motor containing portion;
   a generally U-shaped handle formed by a pair of elongate arms and a connecting gripping section, wherein the ends of said pair of arms distal said gripping section are secured to said body on either side of said motor containing portion; and
   an elongate sickle knife assembly extending longitudinally outward from said front body portion including an elongate central bar having blades extending horizontally outward from its elongate sides and an elongate longitudinally reciprocating cutter having blades extending horizontally outward from its elongate sides, said blades, said bar and said blades of said cutter cooperating to slice vegetation between them as said cutter reciprocates; and an extension device for enabling an operator to hold the body of the hedge trimmer at least six feet from the body of the operator, comprising:

an elongate securing member having a front end and a rear end, said securing member defining a longitudinal channel, said member comprising:

a forward cradle portion defining a forward portion of said channel, said forward channel portion being generally U-shaped, having a generally flat horizontal bottom between a pair of vertical sides, said forward channel bottom having a width slightly greater than the width of said front body portion of said trimmer and said forward channel sides having a height sufficient to prevent the side to side movement of said front body portion of said trimmer;

a first securing strap forward of said raised motor containing a portion of said trimmer extending from one side of said forward cradle portion to the other side of said forward cradle portion;

a first fastener for securing said first securing strap between said one side of said forward cradle portion and said other side of said forward cradle portion tightly over and against said front body portion of said trimmer;

a rearward cradle portion defining a rearward portion of said channel, said rearward channel portion being generally U-shaped, having a generally flat horizontal bottom between a pair of vertical sides, said rearward channel bottom having a width slightly greater than the width of said rear body portion of said trimmer and said rearward channel sides having a height of approximately one-half the height of said rear body portion of said trimmer;

a second securing strap rearward of said raised motor containing portion of said trimmer extending from one side of said rearward cradle portion to the other side of said rearward cradle portion;

a second fastener for securing said second securing strap between said one side of said rearward cradle portion and said other side of said rearward cradle portion tightly over and against said rear body portion of said trimmer; and a center cradle portion connecting said forward cradle portion and said rearward cradle portion, said center cradle portion defining a center portion of said channel connecting said forward portion of said channel to said rearward portion of said channel, said center portion of said channel being generally U-shaped, having a bottom and a pair of vertical sides, said center portion bottom defining a generally arcuate vertical shoulder between said forward portion of said channel and said rearward portion of said channel and said center portion bottom being of decreasing width from front to rear so that said sides of said center portion of said channel form a pair of horizontal shoulders between said forward portion of said channel and said rearward portion of said channel; and an elongate shaft having an operator end and a trimmer end, said trimmer end being secured to the rear end of said securing member, wherein during operation the operator end of the shaft is supported and the angle and position of said operator end of said shaft is controlled by the hands of the operator allowing the operator to freely maneuver the trimmer end of the shaft.

2. The hedge trimming system of claim 1, wherein said trimmer further includes a finger grip depending from said central portion of said trimmer and said bottom of said center cradle portion further defines a longitudinally elongate vertical recess having a depth which is slightly greater than the height of said finger grip and a width slightly greater than the width of said finger grip.

3. The hedge trimming system of claim 2, wherein said sides of said center cradle portion extend vertically above said ends of said pair of arms of said trimmer handle, distal said gripping section and each of said sides further defines a notch which restricts the forward and rearward movement of said distal ends of said handle relative said trimmer handle.

4. The hedge trimming system of claim 3, wherein said sides of said central body portion of said trimmer are at least one quarter of one inch tall.

5. The hedge trimming system of claim 4, wherein said first and said second securing strap surround both said trimmer and said securing member.

* * * * *